United States Patent Office 3,489,788
Patented Jan. 13, 1970

3,489,788
PROCESS FOR THE RECOVERY OF ANTIMONY AND URANIUM CATALYST METALS
Ronald D. Clark, Warrensville Heights, and Ernest C. Milberger, Solon, Ohio, assignors to The Standard Oil Company, Cleveland, Ohio, a corporation of Ohio
No Drawing. Filed Jan. 25, 1967, Ser. No. 611,559
Int. Cl. C07c 121/02; C01b 29/00; C01g 43/02
U.S. Cl. 260—465.3                                12 Claims

ABSTRACT OF THE DISCLOSURE

It has been discovered that mixtures of antimony oxides and uranium oxides which are "dissolved" in a molten salt mixture particularly a mixture comprising the bisulfates of sodium and potassium, may be conveniently removed from the molten salt thus decontaminating the molten salt, by contacting with either ammonia or hydrogen sulfide or by solvent extraction with a modified kerosene solvent, or by any one of several combinations of these steps, provided that the contaminated molten salt is first dissolved in water, which dissolution step has unexpectedly been found to precipitate substantially all of the antimony component as the sulfate. Since contamination of the molten salt which is the inevitable result of catalyst carry-over from an olefinammoxidation reactor results in loss of ammonia absorption efficiency and degradation of the nitrile reaction product, removal of the catalyst components for reuse in catalyst remanufacture has a two-fold utility.

CROSS-REFERENCE TO RELATED APPLICATIONS

Ser. No. 592,992 filed on Nov. 9, 1966; and Ser No. 454,732 filed on May 10, 1965.

BACKGROUND OF THE INVENTION

The present invention relates to the recovery of valuable catalytic metal compounds which are lost from reactors used in the manufacture, by catalytic oxidation, of $\alpha$-$\beta$ monoolefinically unsaturated nitriles. More particularly, the process of the instant invention pertains to the recovery of valuable metal oxides from a molten salt (also called an acid melt) system used for the recovery of excess ammonia in the reactor effluent.

It is of little import whether the reactor is of a fixed bed or fluidized bed type, or whether the excess ammonia in the reactor effluent is significant or not. Suffice that the "carry-over" of catalyst oxides with the reaction products be soluble in the molten salt and that the prolonged build-up of the catalyst oxides be undesirable for effective operation of the fused salt system.

Catalysts useful in the commercial production of the above-mentioned nitriles usually include one or more relatively valuable metal oxides. The efficient and economic recovery of these metal oxides is the key to making a profitable process more profitable.

A particularly desirable group of catalysts for the manufacture of the above-mentioned nitriles comprises the oxides of antimony and uranium alone or supported on carrier materials such as silica, alumina, zirconia, alundum, silicon carbide, and the inorganic phosphates, silicates, aluminates, borates and carbonates stable under the reaction conditions to be encountered in the use of the catalyst. Preparation of a useful antimony oxide-uranium oxide catalyst is described in U.S. Patent No. 3,198,750.

A detailed description of a fused salt system used in the recovery and recycle of ammonia in the catalytic ammoxidation of an olefin will be found in copending application Ser. No. 592,992 filed on Nov. 9, 1966. Briefly, gaseous reactants including an olefin, a molecular oxygen containing gas and an excess of ammonia are fed to a fluidized bed catalytic reactor under the desired conditions of temperature and pressure. Products of reaction are bubbled through a molten salt bath in which excess ammonia and catalyst fines "carry-over" are trapped. Substantially all of the remainder of the reactor effluent passes through the molten salt bath unchanged. In the continuous process, which is the preferred embodiment of the above-mentioned application, at least a portion of the "rich" molten salt, rich in absorbed ammonia from the reactor effluent, is continuously withdrawn, heated to effect desorption of absorbed ammonia which is recycled to the reactor, and the remaining "lean" molten salt is recycled to the molten salt bath. Desorption of the ammonia may be aided by the injection of air into the molten salt bath. Ammonia liberated from the molten salt is recycled to the reactor together with the stripping air.

Molten salts have been used in the past as a high efficiency heat-transfer medium and in some electrolytic applications. Copending application Ser. No. 454,732 now U.S. Patent No. 3,377,378 of John F. Jones discloses a process in which a molten salt mixture may be used as a medium in which to carry out an organic reaction.

SUMMARY

The practice of recovering and recycling excess ammonia from ammoxidation reactor effluent is very novel (the subject of copending application Ser. No. 592,992). To date, the prior art contains no discussion, to the knowledge of the applicants, as to the problem of contaminating a molten salt mixture with a mixture of antimony oxides, uranium oxides and catalyst support. Though a number of methods may be adapted from analytical chemistry textbooks, any one of which could achieve the desired decontamination of the molten salt, the process of the instant invention is the only one based on the discovery that the contaminated molten salt will precipitate out the bulk of the antimony component as antimony sulfate, simply by diluting with at least enough water so as to form a saturated aqueous solution of the molten salt components, at the same time leaving all the uranium component in solution.

An object of the instant invention is to provide an unexpectedly efficient method of recovering certain metal oxides by absorbing them into a molten salt solution and separating the individual metal salts therefrom.

Another object of the instant invention is to recover the metals in the form of salts which can readily be employed in the remanufacture of make-up catalyst.

A further object of the instant invention is to recover the valuable, relatively harmful antimony and uranium compounds in a safe manner, which compounds would otherwise have to be discarded along with the molten salt when the level of contamination grew intolerable.

DESCRIPTION OF THE PREFERRED EMBODIMENT

If the primary purpose of the molten salt system is the recovery of the valuable metals, then the concentration of metal components may be allowed to build up to the point where the physical properties of the molten salt are so altered as to effect its fluidity and dissolution ability adversely. If the primary purpose of the molten salt system is the absorption and subsequent release of ammonia which is to be recovered or recycled to the ammoxidation reaction in the reactor, then the molten salt should be maintained at a metal oxide concentration of less than twenty percent (20%) computed as parts by weight of total metal oxides, including catalyst support, per hundred parts by weight of metal oxide containing molten salt.

The description of the instant invention as it may be practiced in various combinations of steps utilizing the central fact that substantially all the antimony is precipitated as antimony sulfate upon dilutions with water, will allow the skilled technician to select the best modus operandi where the primary purpose of the molten salt system is to recover antimony and uranium metals in the form of salts. The following description of the instant invention will be directed chiefly to the ammoxidation art, where the prime concern is to maintain a tolerable contamination of the molten salt sufficient to permit the effective absorption and subsequent desorption of excess ammonia in reactor effluent without adversely affecting the remainder of the reactor effluent.

The process of the instant invention, hereinafter described in detail, is specifically with respect to a fluid-bed reactor for the manufacture of acrylonitrile from propylene, ammonia and air utilizing the above-mentioned antimony oxide-uranium oxide catalyst described in U.S. Patent No. 3,198,750, wherein salts of antimony and uranium formed when catalyst fines are "dissolved" in the molten salt can be precipitated or extracted, not necessarily individually, from an aqueous solution. With obvious modifications, the process of this invention may be utilized whenever oxides of antimony and uranium are to be separated as salts from mixtures of acid salts or from aqueous solutions of acid salts, and particularly from aqueous solutions of sodium and potassium acid sulfates.

The molten salts or acid melts used according to this invention are melts of those substances which contain acid hydrogen atoms and the term acid melt is employed herein to signify this type of melt. Preferably, the acid salts of phosphoric or sulfuric acid, especially the alkali metal and ammonium acid salts of such acids, are employed for the production of such melts. Most preferred salts are the sulfates and bisulfates of sodium and potassium.

Reactor effluent from an ammoxidation process such as described in U.S. Patent No. 3,198,750 is absorbed in an acid melt comprising a mixture of sodium hydrogen sulfate and potassium hydrogen sulfate. The reactor effluent comprises products of reaction, catalyst "carryover" and excess reactants; excess ammonia will usually be present if the reaction involves the oxidation of an olefin-ammonia mixture. The effect is to "dissolve" the catalyst carry-over in the molten salt bath, consuming acid according to the equation:

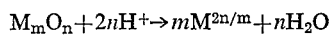

$$M_mO_n + 2nH^+ \rightarrow mM^{2n/m} + nH_2O$$

The precise state of the metals in the molten salt is not known. It is expected that when the metal oxides are "dissolved" in the molten salt the antimony and uranium components may be present as metallic ions, metal oxides, metal sulfates or metal bisulfates, or a mixture of two or more of these states. Hereinafter the antimony and uranium present in the molten salt will be referred to as the antimony component and the uranium component, or the metal components, and are meant to include all the states that these metals may acquire in the molten salt.

When a predetermined level of antimony and uranium components is reached, a slipstream of molten salt is withdrawn from the system. Though such a slipstream may be withdrawn at any point in the system for economic reasons it will be apparent that, if the step following the dilution step is ammoniation, then "rich" melt would be withdrawn; and if the step immediately following the dilution step is either solvent extraction or contacting with hydrogen sulfide then "lean" melt would be withdrawn.

At whichever point in the system molten salt is withdrawn, the first step is to dissolve the molten salt in at least enough water so as to form a saturated aqueous solution of the molten salt components. It is preferred to use about 5 parts by weight of water to 1 part by weight of salt to obtain a satisfactory precipitate quickly. More water may be used but it will be apparent to one skilled in the art that the more dilute the solution the slower and more incomplete will be the precipitation and the more cumbersome and costly will be the separation process.

(A) USING AMMONIA

When the molten salt slipstream is diluted as described above, the catalyst support, usually silica, incorporated into the molten salt will not go into solution. At the same time the bulk of the antimony component precipitates out of aqueous solution as the antimony sulfate. The insolubility of the antimony sulfate is enhanced by the high sulfate concentration of the aqueous solution of the salts. The solid phase comprising precipitated antimony sulfate along with the insoluble catalyst support may be separated from the liquid phase by any conventional means such as filtration, centrifugation, sedimentation and the like. A preferred manner of separation is by sedimentation in a settling chamber.

The aqueous solution from the settling chamber contains the remainder of the antimony component along with the uranium components both of which may be forced out of solution substantially simultaneously. As the catalyst metal components are to be reused in the manufacture of fresh catalyst it is not important that one catalyst component may be contaminated with another.

Since the bulk of the antimony component has been removed as antimony sulfate in the dilution step it would be desirable to select a precipitation agent which will precipitate not only the uranium component but also the remaining antimony component. The choice of a precipitation agent should be such that, over a period of many cycles, it will not accumulate in the system as another contaminant requiring removal, will not be decomposed under the severe operating conditions of the process, and the presence of which, in the molten salt, will not decompose the nitrile product of the reactor effluent. These stringent requirements quickly rule out the use of a variety of precipitation agents and commonly known analytical techniques. Ammonia is a precipitation agent particularly well-suited for the task, at the same time being easily and economically available.

The aqueous acidic solution comprising the uranium component and the remaining antimony component is treated with ammonium hydroxide, liquid ammonia or gaseous ammonia in an ammonia absorber. The pH of the solution climbs gradually from about 1 to about 2 when the solution becomes slightly cloudy indicating the precipitation of what appears to be a hydrated antimony oxide. As there is only a little antimony component normally present in the solution the particles of precipitate stay in suspension as the pH continues to rise to about 4. Soon after, then the pH is at about the equivalence point, that is, within the range from about 4.5 to about 7.5, a large yellow precipitate is formed which appears to be ammonium diuranate. This large ammonium diuranate precipitate appears to help force the finely divided hydrated antimony oxide out of suspension. Substantially all the uranium component is precipitated out of solution before the pH reaches about 11. Generally it is preferred that ammoniating the solution be discontinued at about pH 10 for economic reasons.

The solid phase comprising the combined precipitates of ammonium diuranate and hydrated antimony oxide may be separated from the liquid phase by any conventional means such as filtration, centrifugation, sedimentation and the like. A preferred manner of separation is by filtration in appropriate filtration apparatus. The filtrate is "scavenged solution" which is returned to the ammonia desorber where rich molten salt from the reactor effluent absorber is desorbed.

(B) USING HYDROGEN SULFIDE

The method described in A above serves to separate the catalyst components as antimony sulfate on the one hand and ammonium diuranate contaminated with hydrated antimony oxide on the other. If desired, the antimony and uranium components may be separated individually, one virtually uncontaminated by the other, by contacting the filtrate from the dilution step with $H_2S$ in a hydrogen sulfide absorber. The remaining antimony component is thus precipitated as antimony sulfide leaving the uranium component in solution. The precipitated antimony sulfide may be separated from solution by any convenient means, preferably by filtration. The filtrate comprising dissolved uranium component in a hydrogen-sulfide rich solution is heated to drive off hydrogen sulfide which is recycled to the hydrogen sulfide absorber.

The uranium component is now in aqueous solution substantially free of hydrogen sulfide. It may be removed by ammoniating the solution to precipitate ammonium diuranate as in A above; or the uranium may be removed by solvent extraction with an organic solvent specific for uranium component removal as described hereinafter. Removal of the uranium component in either of these procedures will leave a scavenged solution of potassium and sodium acid sulfate salts. The scavenged solution may be recycled to the ammonia desorber introducing water into the molten salt to maintain the potassium and sodium salts as bisulfates.

(C) USING SOLVENT EXTRACTION

Another convenient method of effecting the individual separation of catalyst components, one from the other, without using hydrogen sulfide, is by solvent extraction of the uranium component with an organic extraction medium, as follows:

A slipstream of molten salt is withdrawn from the system at a point where the absorbed ammonia in the salt is relatively insignificant. This lean molten salt is dissolved in water so that each part by weight of the salt is dissolved in at least 2.5 parts by weight of water. Most of the antimony component will precipitate out of solution and may be removed together with insoluble catalyst support by any conventional means, preferably by filtration. The filtrate containing the remainder of the antimony component and substatially all of the uranium component is extracted with a solvent mixture consisting of 5 parts by weight n-decanol, 5 parts by weight t-isooctylamine and 190 parts by weight kerosene. Only the uranium content is transferred to the solvent solution. The solvent solution is separated from the aqueous solution preferably by decantation of the supernatant organic layer. The decanted organic layer is mixed with water and continuously agitated while small incremental amounts of magnesium oxide are added till the pH is in the range of from about 3.8 to 4.5. Only a relatively small amount of magnesium oxide is necessary. The agitation is stopped and the mixture allowed to settle. A yellow solid thought to be magnesium diuranate is formed in the aqueous layer and gradually settles to the bottom of the vessel. The magnesium diuranate may be separated by any conventional means such as filtration, sedimentation or centrifugation. The solid obtained is then acidified, preferably with nitric acid and the nitrates crystallized out by fractional crystallization from aqueous solution.

It will be seen from the descriptions of the various modifications of the instant invention that, depending upon the degree of separation desired and the economics of separation, any one of the modifications or any combination thereof might be used. The following examples describe the actual steps performd in practicing the various methods outlined above. In all the examples all "parts" correspond to "parts by weight" unless otherwise specified.

EXAMPLE I 10 parts of lean molten salt contaminated with 1 part catalyst (60 percent mixed antimony oxides and uranium oxides, 40 percent silica) were vigorously mixed into 50 parts water and the solution was allowed to stand. The initially yellow-green solution became cloudy and solid antimony sulfate precipitated from solution along with inert silica catalyst support. The supernatant aqueous solution was decanted and treated with 5 parts of a 28 percent ammonium hydroxide solution, addition of the solution being in stages. A solid, identified as a mixture of ammonium diuranate and hydrated antimony oxide precipitated from solution and was separated by filtration. The filtrate had a pH of 9.6 and contained 0.0016 percent of uranium as indicated by fluoroscopic analysis.

Example II 10 parts of lean molten salt contaminated with 1 part catalyst (60 percent mixed antimony oxides and uranium oxides, 40 percent silica) were vigorously mixed into 50 parts water and the solution was allowed to stand. The initially yellow-green solution became cloudy and solid antimony sulfate precipitated from solution along with inert silica catalyst support. The supernatant liquid was led into a flask and hydrogen sulfide was bubbled into the liquid. A further quantity of the antimony component of the catalyst precipitated from the aqueous solution. Analysis indicated that substantially all the antimony was removed from the aqueous solution. The precipitate was removed by filtration and the filtrate heated to drive off the dissolved hydrogen sulfide gas. The filtrate, free of hydrogen sulfide was treated with 5 parts of a 10 percent ammonium hydroxide solution. A yellow compound identified as ammonium diuranate was precipitated from solution and sepaarted by filtration. On concentrating the fibrate by heating on a water bath excess ammonia was driven off leaving a solution of sodium and potassium salts.

Example III 10 parts of lean molten salt contaminated with 1 part catalyst (60 percent mixed antimony oxides and uranium oxides, 40 percent silica), were vigorously mixed into 50 parts water and the solution was allowed to stand till sedimentation of antimony sulfate and inert silica catalyst support was essentially complete. The supernatant aqueous solution containing 0.127 percent uranium was poured off and extracted with 80 parts of a solution consisting of 5 parts n-decanol, 5 parts t-isooctylamine and 190 parts kerosene. The aqueous solution which was originally yellow-green in color was colorless after extraction, and the organic solution turned bright yellow. The extracted aqueous solution contained only 0.004 percent uranium.

The yellow organic layer was decanted off the aqueous layer and mixed with 40 parts of water while being agitated. To the mixture was slowly added finely divided magnesium oxide. After a short interval the pH was checked. Additional magnesium oxide was added till the pH was about 4.0. The yellow color passed from the organic layer to the aqueous layer and yellow solids were deposited on the bottom of the vessel when the mixture was allowed to settle.

The yellow solids were filtered from the aqueous solution and dissolved in concentrated nitric acid. The acid solution was diluted with water and the uranium and magnesium nitrates fractionally crystallized therefrom.

We claim:

1. In a process for the ammoxidation of $\alpha$-$\beta$ mono-olefinically unsatudated hydrocarbons utilizing a catalyst comprising the mixed oxides of antimony and uranium on a catalyst support, wherein a molten sulfur salt or acid melt is used for the selective absorption of excess ammonia in the reactor effluent yielding an ammonia-rich melt, at the same time dissolving catalyst carried over with the reactor effluent forming sulfuric acid salts of antimony and uranium, and ammonia from said ammonia-rich melt is subsequently driven off yielding an ammonia-lean melt, the improvement consisting of:
(a) withdrawing a portion of said molten salt rich in catalyst values,
(b) dissolving said portion in sufficient water to put the water-soluble components in solution,
(c) separating the insoluble components comprising antimony sulfate and any carried over catalyst support from said solution yielding an uranium-rich solution, and
(d) recovering uranium salt from said aqueous uranium-rich solution leaving a scavenged solution.

2. The process of claim 1 comprising the additional step, after step (d), of recycling said scavenged solution to the step of desorbing excess ammonia from said rich melt.

3. The process of claim 1 wherein:
step (a) comprises withdrawing a portion of said ammonia-rich melt, and
step (d) comprises:
(i) ammoniating said uranium-rich solution to force out of solution a precipitate comprising ammonium diuranate, and
(ii) separating said ammonium diuranate from solution leaving a scavenged solution.

4. The process of claim 3 comprising the additional step, after step (d) of recycling said scavenged solution to the step of desorbing excess ammonia from said rich melt.

5. The process of claim 3 wherein step (d) comprises:
(i) extracting said aqueous uranium-rich solution by contacting said solution with a hydrocarbon mixture of a primary alcohol containing from about 6 to about 12 carbon atoms, alkyl substituted amine and a predominantly straight chain petroleum fraction comprising from about 7 to about 15 carbon atoms characterized by a specific gravity of from 35 to 50° API;
(ii) separating a uranium enriched hydrocarbon mixture from a uranium depleted aqueous solution;
(iii) diluting said mixture separated in (ii) with water forming a diluted mxture;
(iv) adding sufficient magnesium oxide to said diluted mixture to precipitate magnesium diuranate, and
(v) separating said magnesium diuranate.

6. The process of claim 1, wherein: step (a) comprises withdrawing a portion of said ammonia-lean melt, and comprising after step (c) and before step (d) the additional steps of:
(i) contacting said aqueous uranium-rich solution with hydrogen sulfide
(ii) separating precipitated antimony sulfide from the hydrogen sulfide-containing solution, and
(iii) driving off hydrogen sulfide from said hydrogen sulfide-containing solution leaving a uranium rich hydrogen sulfide-depleted solution.

7. The process of claim 6 comprising recycling hydrogen sulfide driven off to step (i).

8. The process of claim 7 wherein step (d) comprises
(i) ammoniating said hydrogen sulfide-depleted solution to precipitate ammonium uranates, and
(ii) separating said ammonium uranate from solution.

9. The process of claim 7 wherein step (d) comprises:
(i) extracting said aqueous uranium-rich solution by contacting said solution with a hydrocarbon mixture of a primary alcohol containing from about 6 to about 12 carbon atoms, alkyl substituted amine and a predominantly straight chain petroleum fraction comprising from about 7 to about 15 carbon atoms characterized by a specific gravity of from 35 to 50° API,
(ii) separating a uranium enriched hydrocarbon mixture from a uranium depleted aqueous solution;
(iii) diluting said mixture separated in (ii) with water forming a diluted mixture,
(iv) adding sufficient magnesium oxide to said diluted mixture to precipitate magnesium diuranate, and
(v) separatng said magnesium diuranate.

10. The process of claim 1 wherein said molten salt is at least one salt selected from the group consisting of the alkali metal and ammonium acid salts of sulfuric acids.

11. The process of claim 10 wherein said molten salt comprises a mixture of sodium hydrogen sulfate and potassium hydrogen sulfate.

12. A process for the recovery of antimony and uranium components from a mixture comprising said components and silica, wherein a molten salt is used for dissolving only said uranium and antimony components, said mixture to form a salt enriched in said uranium and antimony components comprising in combination the steps of:
(a) withdrawing at least some of the enriched salt,
(b) dissolving said withdrawn enriched salt in sufficient water to put the water-soluble components in solution,
(c) separating the insoluble components comprising antimony sulfate and silica from said solution yielding an uranium-rich solution, and
(d) recovering uranium salt from said uranium-rich solution leaving a scavenged solution.

References Cited
UNITED STATES PATENTS

| | | | |
|---|---|---|---|
| 3,322,509 | 5/1967 | Vogg | 23—325 |
| 3,178,257 | 4/1965 | Hart | 23—335 |
| 3,034,856 | 5/1962 | Reusser | 23—335 |
| 2,780,516 | 2/1957 | Nevenzel | 23—333 |
| 1,502,285 | 7/1924 | Wilson | 23—136 |

REUBEN EPSTEIN, Primary Examiner

M. J. McGREAL, Assistant Examiner

U.S. Cl. X.R.

23—117, 136, 325, 335, 340; 252—301.1